United States Patent [19]
Fukuda et al.

[11] Patent Number: 5,938,300
[45] Date of Patent: Aug. 17, 1999

[54] CRAWLER-MOUNTED SLOPE TRAVELING MACHINE AND SHOE LINK FOR SAME

[75] Inventors: Kosei Fukuda; Shigeru Yoshida; Chikashi Kami; Minoru Miyasato, all of Tokyo, Japan

[73] Assignee: Tenox Corp., Tokyo, Japan

[21] Appl. No.: 08/696,864

[22] PCT Filed: Feb. 17, 1995

[86] PCT No.: PCT/JP95/00222

§ 371 Date: Nov. 18, 1996

§ 102(e) Date: Nov. 18, 1996

[87] PCT Pub. No.: WO95/22481

PCT Pub. Date: Aug. 24, 1995

[30] Foreign Application Priority Data

Feb. 18, 1994 [JP] Japan ................................ 6-020778
Aug. 19, 1994 [JP] Japan ................................ 6-223147

[51] Int. Cl.[6] ................................................ B62D 55/27
[52] U.S. Cl. ........................ 305/191; 404/84.8; 298/18; 305/201
[58] Field of Search .................... 305/157, 158, 305/159, 160, 165, 180, 185, 40, 51, 187, 191, 192, 200, 201; 180/6.54, 6.7; 298/17.5, 18; 404/84.1, 84.8, 127, 84.05, 103

[56] References Cited

U.S. PATENT DOCUMENTS

| | | | |
|---|---|---|---|
| 1,200,438 | 10/1916 | Jacoby et al. | 180/6.54 |
| 1,304,357 | 5/1919 | Norelius | 305/191 |
| 1,380,574 | 7/1921 | Mason | 305/191 X |
| 1,474,456 | 11/1923 | Watson | 305/191 |
| 1,605,144 | 11/1926 | Reuter | 305/191 |
| 1,840,779 | 1/1932 | Johnston | 305/19 |
| 2,455,307 | 11/1948 | Irvin | 305/201 X |
| 2,866,667 | 12/1958 | Ratkowski | 305/191 |
| 3,550,968 | 12/1970 | Rymes | 305/191 |
| 4,637,665 | 1/1987 | Burdick et al. | 305/191 |
| 4,650,017 | 3/1987 | Pelletier et al. | 180/9.1 |
| 5,405,215 | 4/1995 | Lutz | 298/18 X |

FOREIGN PATENT DOCUMENTS

| | | | |
|---|---|---|---|
| 2423147 | 11/1975 | Germany | 305/191 |
| 5164575 | 12/1980 | Japan | 305/201 |
| 1338572 | 11/1973 | United Kingdom | 404/84.1 |

*Primary Examiner*—Russell D. Stormer
*Attorney, Agent, or Firm*—Muramatsu & Associates

[57] ABSTRACT

A crawler-mounted construction machine for executing slope strengthening work on a slope or a crawler-mounted slope traveling machine for carrying construction materials on a slope has shoe links (12) or (107) composed of shoe elements (18) or (113). Each shoe element is provided on its bearing surface with projections (23) or (118) as anti-side slip grousers, in addition to ordinary grousers (19) or (114). The projections (23) or (118) are provided as plate-shaped projections extending in parallel to or at an inclination to the traveling direction and arranged on the shoe links continuously or at intervals in the traveling direction. The height of each projection is set to be greater than that of each ordinary grouser (19) or (114) to prevent the traveling machine from the side slip due to the load acting on the traveling machine during its horizontal travel or work on the slope. The projections are also provided as vertically-elongate columnar projections (200) having a small width in the traveling direction to prevent slope-protecting concrete frames laid on the surface of the slope from the shearing breakage and to reduce the damage of the surface of the slope caused when the traveling machine turns to a different direction.

4 Claims, 17 Drawing Sheets

| Width of shoe element | | 230 mm | | | | 156mm |
|---|---|---|---|---|---|---|
| Height of grousers | 0 | 20 ① | 35 | ① 50 | 50 ② | 0 |
| Position of grousers | — | 谷側・両 | 谷側・両 | 谷側・両 | 山・谷両 | — |
| Load (kg) | 200 | 460 | 630 | 900 | 1420 | 500 |
| Side slip (mm) | 7.2 | 61 | 125 | 62 | 39 | 93.4 |
| Load factor (%) | 81.1 | 65.2 | 57.7 | 48.9 | 37.7 | 63.7 |
| Remarks | | | | | | |

① : Both sides of downside shoe link
② : Both sides of downside and upside shoe links

FIG. 12
(a)
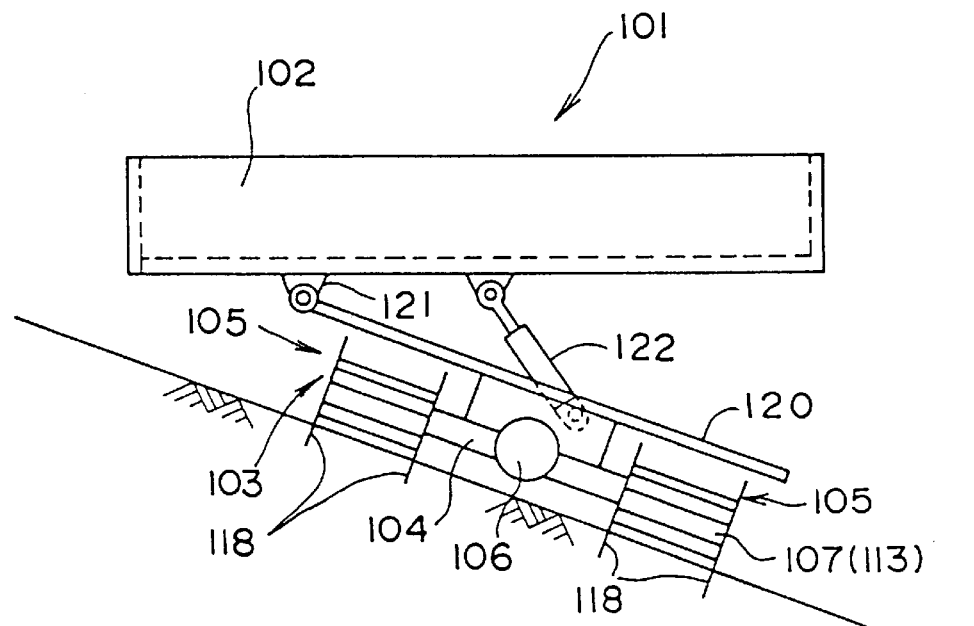
(b)
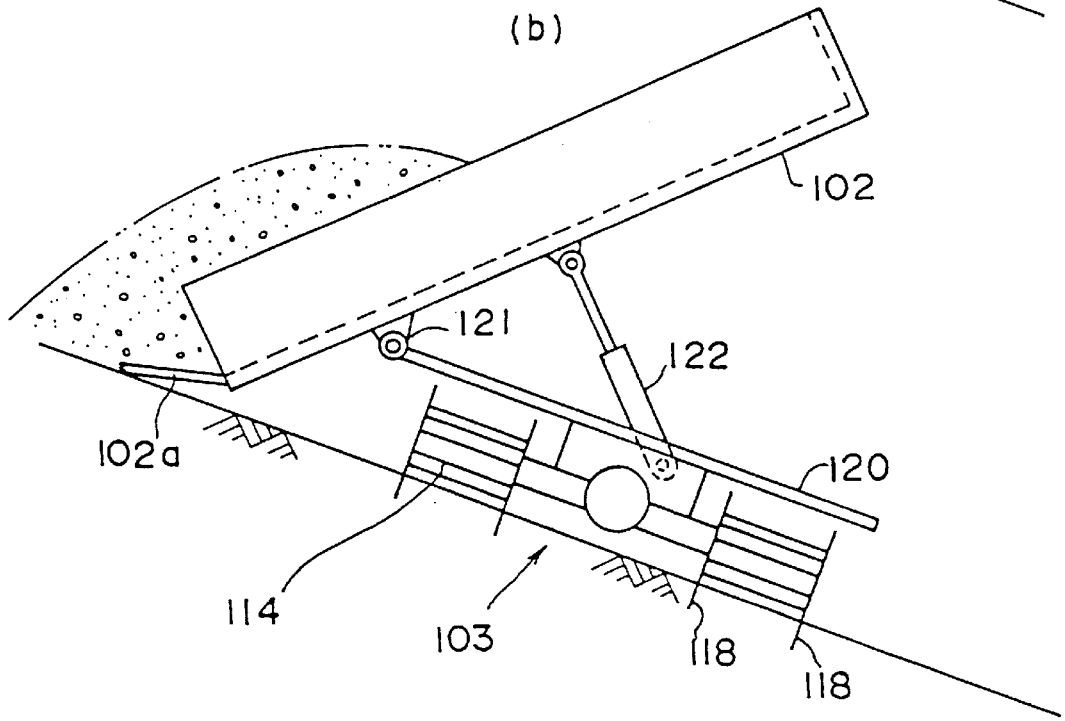

FIG. 13
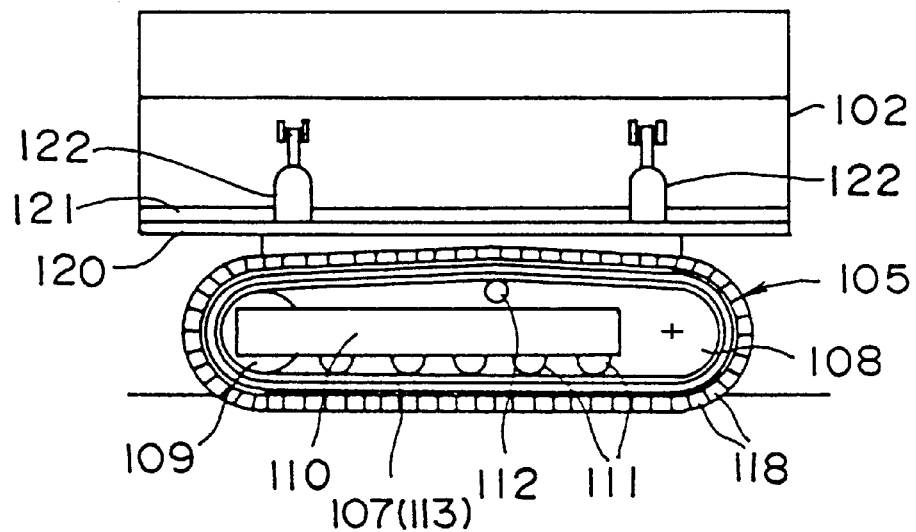
FIG. 14
(a)
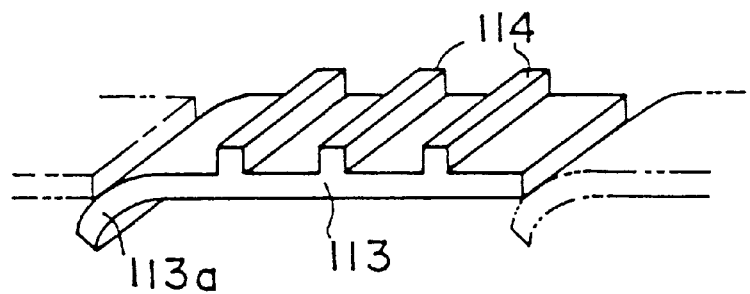
(b)
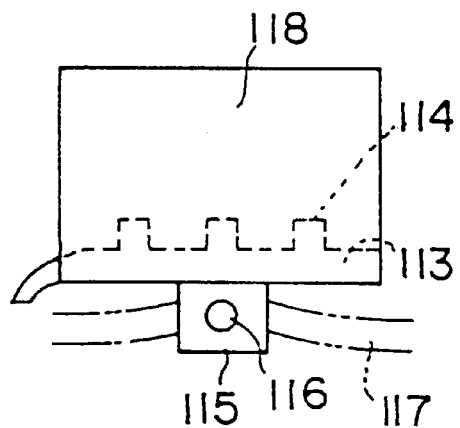
(c)
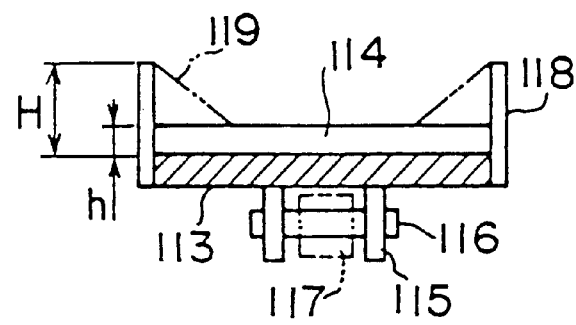

FIG. 16
(i) 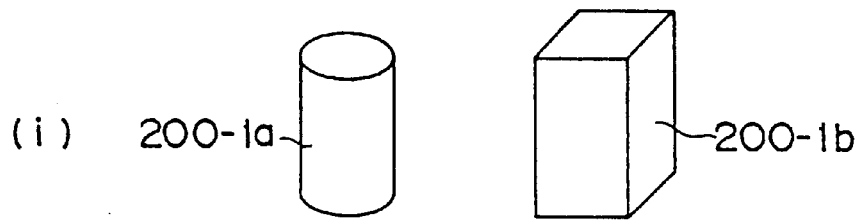
(ii) 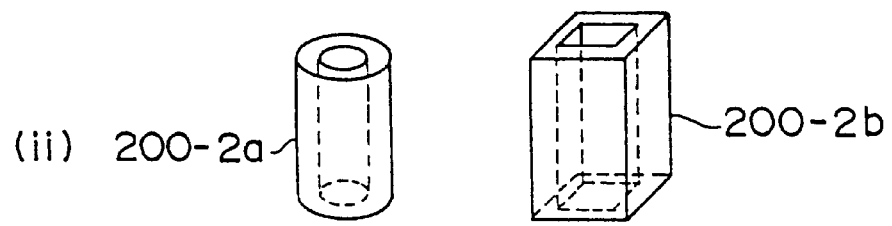
(iii) 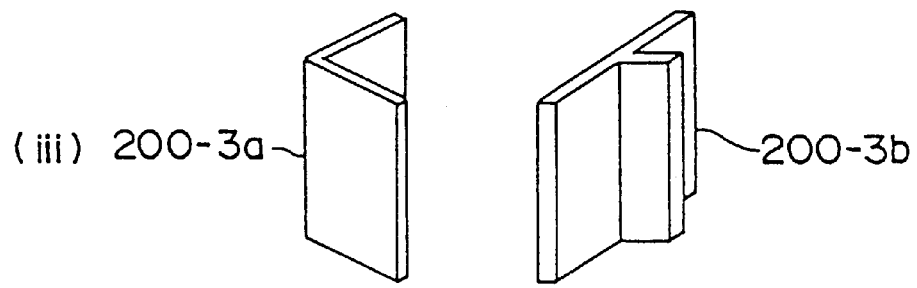
(iv) 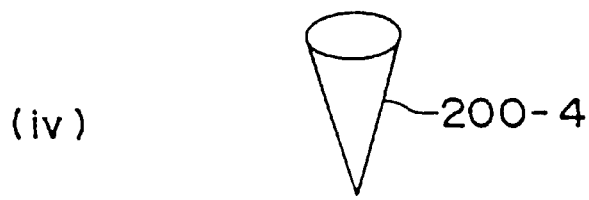
(v) 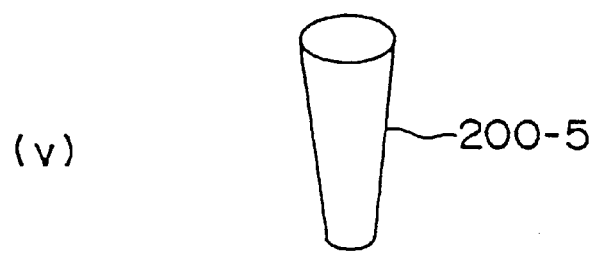

CRAWLER-MOUNTED SLOPE TRAVELING MACHINE AND SHOE LINK FOR SAME

TECHNICAL FIELD

This invention relates to a crawler-mounted slope traveling machine, which has a crawler-mounted base carrier to permit the crawler-mounted slope traveling machine to travel on a slope, and is, in particular, effectively applied to a construction machine which travels on a gentle slope for executing construction work, or a carrying machine which travels on a gentle slope for carrying construction materials.

BACKGROUND ART

A recently-developed slope strengthening method for strengthening an embankment slope to prevent the collapse of the embankment slope due to earthquakes or rainfalls includes the steps of mixing the soil and a solidifying material together for solidification of the soil while driving and advancing a drilling-mixing machine of an earth auger type or the like to excavate the ground, and constructing anchors in the central portion of the solidified soil.

In case of applying such a slope strengthening method to small-scale slope strengthening work for strengthening a gentle slope, materials have been conventionally carried by human power, and drilling and mixing work has been executed by a back-hoe type construction machine placed on a service road. On the other hand, in case of applying the same to relatively large-scale slope strengthening work, a temporary support structure for a construction machine has been constructed, and an earth auger-type construction machine has been placed on the temporary support structure for executing drilling and mixing work.

However, the conventional human-powered work has the following problems.

① It is difficult for workers to freely move on a slope for carrying work or earthwork, the labor effectiveness of human-powered work is extremely low, and such work is very dangerous.

② Human-powered work needs a long term of work and increases construction costs.

③ The back hoe-type construction machine is unable to be used when any service road is not available near the slope.

The construction of the temporary support structure has the following problems as well.

① The construction of the temporary support structure requires an additional term of work and additional costs.

① Materials for the temporary support structure must be carried by human power when any service road is not available near the slope, which causes problems similar to those attributable to human-powered work.

An alternative slope strengthening method may employ a crawler-mounted construction machine of an earth auger type which travels on a slope for direct slope strengthening work. Although current crawler-mounted construction machines are able to climb up and down slopes, such machines are unable to travel on slopes in horizontal directions (i.e., along contour lines of slopes), since shoe links of current crawler-mounted traveling machines are provided with only grousers (i.e., projections) extending perpendicularly to the advance direction of the shoe links. Further, the above current crawler-mounted traveling machines are unable to remain stable during operation and hence not applicable to such a slope strengthening method.

Usually, construction materials including earth and sand, concrete blocks, pipes and sheet piles or the like have been carried on slopes by the following methods.

(1) Methods employing human power
(2) Methods employing belt conveyors
(3) Methods using temporary haulage roads constructed on slopes However, these construction-material carrying methods have the following problems.

(1) Methods employing human power
① Only small and light materials are able to be carried, while large and heavy materials are unable to be carried.
② It is difficult for workers to freely move on a slope, the labor effectiveness of human-powered carrying work is extremely low, and such carrying work is very dangerous.
③ A long term of work is required, a nd an increase in cost is inevitable due to the extremely-low labor effectiveness.

(2) Methods employing belt conveyors
① Although earth and sand are able to be conveyed, it is difficult to convey materials other than earth and sand.
② It is difficult to install belt conveyors on slopes.

(3) Methods using temporary haulage roads constructed on slopes
① The labor effectiveness of carrying work is low in case of small and light materials as much as those are able to be carried by human power.
② The construction of temporary haulage roads having a road tonnage capability sufficient for the traffic of construction vehicles require s the construction of temporary support structures or the like, which causes an increase in term of work and that in cost.

The present invention has been made in order to overcome the above problems, and it is a first object of the present invention to provide a crawler-mounted slope traveling machine which is capable of freely traveling on a slope with safety, of securing stability during operation, of efficiently executing construction work on a slope to reduce human-powered work, which has been conventionally required, to the least possible extent, of making temporary support structures unnecessary and of curtailing a term of work and construction costs.

A second object of the present invention is to provide a crawler-mounted slope traveling machine for carrying work which is capable of freely traveling on a slope with safety to carry construction materials, of reducing human-powered work, which has been conventionally required, to the least possible extent, of making temporary support structures unnecessary, and of curtailing a term of work and construction costs.

A third object of the present invention is to provide a crawler-mounted slope traveling machine which is capable of surely preventing a slope traveling machine from side slipping along the declination of a slope while the slope traveling machine is traveling in horizontal directions perpendicular to the declination of the slope or during work in a stationary, sideways-tilted position on the slope, or of causing no breakage of slope protecting members or the like laid on the slope, after the side slipping of the slope traveling machine has been prevented.

DISCLOSURE OF THE INVENTION

A crawler-mounted slope traveling machine according to the present invention is mounted with shoe links composed of shoe elements connected together in an endless form, and is particularly applied to a crawler-mounted drilling-mixing machine or the like to be employed in carrying out a slope strengthening method. Each of the shoe elements is provided on its bearing surface, in addition to grousers (i.e., ordinary grousers) extending perpendicularly to the traveling direction, with anti-side slip grousers, i.e., projections (such as members elongate in the traveling direction, i.e., plate-shaped projections) extending in parallel to or at an inclination to the traveling direction.

The projections extending in parallel to or at an inclination to the traveling direction may be of any shape, such as the shape of a plate elongate in the traveling direction and that of a bar elongate in the traveling direction, provided that the projections are capable of preventing the slope traveling machine from side slipping. However, in view of the ability to penetrate the ground or the facility in manufacture, the plate-shaped projections are preferable. The projections are arranged at intervals so as to leave a space between the adjacent projections. Further, the projections may be inclined to the traveling direction.

These projections having the shape of a plate or the like elongate in the traveling direction are highly effective in anti-side slipping when the height thereof is set to be greater than that of each ordinary grouser, i.e., each grouser included in the shoe links and extending perpendicularly to the traveling direction.

Although it is preferable that both the upside and downside shoe links are provided with such projections, it is effective that only the downside shoe link is provided with such projections (namely, such projections are provided on both the opposite side surfaces of the downside shoe link or such a projection is provided only on the downside surface thereof).

A crawler-mounted construction machine generally comprises a base carrier and an upper structure. When the crawler-mounted slope traveling machine of the present invention is applied to such a crawler-mounted construction machine, a front attachment (i.e., a drilling-mixing device, a bucket for a back hoe, a bulldozing blade for a bulldozer, a crane or the like) for execution of works is attached to the upper structure.

The crawler-mounted slope traveling machine having the above structure is allowed to travel on a slope in horizontal directions, and then stopped at a desired position for drilling-mixing work. The anti-side slip grousers provided on the shoe links are adapted to prevent the slope traveling machine from side slipping during traveling, so that the slope traveling machine is able to stably travel with safety for efficient slope strengthening work and carrying work. Further, the anti-side slip grousers ensure the stability against loads which act on the slope traveling machine during operation, so that drilling-mixing work or the like is able to be executed with safety.

The greater the height of each anti-side slip grouser is, the higher the anti-side slipping effect of the anti-side slip grousers is. Preferably, the height of each anti-side slip grouser is set to be greater than that of each grouser included in the shoe links and extending perpendicularly to the traveling direction. Incidentally, when the height of each anti-side slip grouser is excessively large, the turning performance of the slope traveling machine is deteriorated, and the slope is damaged (destructed). Therefore, the upper limit of the height of each anti-side slip grouser is determined in consideration of the turning performance of the slope traveling machine and the possibility of damages of the slope.

The anti-side slip grousers provided on the downside surface of the downside shoe link are highly effective in anti-side slipping. Therefore, the anti-side slipping effect is also attained when the anti-side slip grousers are provided only on the downside surface of the downside shoe link.

The crawler-mounted slope traveling machine has the shoe links composed of shoe elements each provided with plate-shaped or bar-shaped projections as anti-side slip grousers, in addition to the ordinary grousers. Thus, the crawler-mounted slope traveling machine of the above structure has the following effects.

(1) The slope traveling machine is capable of traveling on a slope in horizontal directions without causing side slipping to attain the improvement in stable traveling in horizontal directions and that in working efficiency. Further, the slope traveling machine is capable of executing construction work with safety without causing side slipping against loads during operation.

(2) Accordingly, human-powered work, which has been conventionally required, is remarkably reduced, and any temporary support structure is not necessary. Thus, a term of work and construction costs are curtailed.

(3) Since the projections are arranged so as to leave a predetermined space between a pair of projections longitudinally adjacent to each other in the traveling direction, there is no possibility that a projecting portion of a slope-protecting concrete frame is caught between the pair of projections and then subjected to shearing breakage.

A crawler-mounted slope traveling machine for carrying work according to the present invention comprises an upper carrier to be loaded with construction materials and a crawler-mounted base carrier. The base carrier has endless shoe links having bearing surfaces provided, in addition to grousers (i.e., ordinary grousers) extending perpendicularly to the traveling direction, with anti-side slip grousers, i.e., projections (such as members elongate in the traveling direction, i.e., plate-shaped projections) extending in parallel to or at an inclination to the traveling direction.

The projections extending in parallel to or at an inclination to the traveling direction may be of any shape, such as the shape of a plate elongate in the traveling direction and that of a bar elongate in the traveling direction, provided that the projections are capable of preventing the slope traveling machine for carrying work from side slipping. However, in view of the ability to penetrate the ground and the facility in manufacture, the plate-shaped projections are preferable. The projections are arranged at intervals so as to leave a space between the adjacent projections. The projections may be inclined to the traveling direction.

These projection having the shape of the plate or the like elongate in the traveling direction are highly effective in anti-side slipping when the height thereof is set to be greater than that of each ordinary grouser, i.e., each grouser included in the shoe links and extending perpendicularly to the traveling direction.

Although it is preferable that both the upside and downside shoe links are provided with such projections, it is effective that only the downside shoe link is provided with such projections (namely, such projections are provided on the opposite side surfaces of the downside shoe link or such a projection is provided only on the downside surface thereof).

The upper carrier is mounted on the base carrier so as to be freely titled in directions perpendicular to the traveling direction by hydraulic cylinders. The upper carrier is tilted toward the upside of the slope so that the slope traveling machine may not be tipped toward the downside of the slope. Further, the center of gravity of the upper carrier in directions perpendicular to the traveling direction is dislocated toward the upside of the slope from a position corresponding to the center of gravity of the base carrier.

The crawler-mounted slope traveling machine for carrying work having the above structure is allowed to travel on a slope in horizontal directions with construction materials loaded on the upper carrier, and then stopped to unload the construction materials from the upper carrier. The anti-side slip grousers provided on the shoe links are adapted to prevent the slope traveling machine for carrying work from side slipping effectively during traveling, so that the slope traveling machine for carrying work is able to stably travel with safety. Further, the anti-side slip grousers are also adapted to prevent the slope traveling machine for carrying work from side slipping while the slope traveling machine for carrying work remains stationary, so that carrying work is efficiently executed with safety.

The greater the height of each anti-side slip grouser is, the higher the effect of anti-side slipping is. Preferably, the height of each anti-side slip grouser is set to be greater than that of each grouser included in the shoe links and extending perpendicularly to the traveling direction. When the height of each anti-side slip grouser is excessively large, the turning performance of the slope traveling machine for carrying work is deteriorated, and the slope is damaged (destructed). Therefore, the upper limit of the height of each anti-side slip grouser is determined in consideration of the turning performance of the slope traveling machine for carrying work and the possibility of damages of the slope.

The anti-side slip grousers provided on the downside surface of the downside shoe link is highly effective in anti-side slipping. Therefore, the anti-side slipping effect is also attained when the anti-side slip grousers are provided only on the downside surface of the downside shoe link.

Since the upper carrier is tilted by the hydraulic cylinders, it is possible to tilt the upper carrier relatively to the slope according to the gradient of the slope so that the upper carrier remains in a horizontal position regardless of the gradient of the slope. Consequently, the construction materials are carried with safety, and earth and sand are automatically unloaded toward the upside of the slope with safety by further increasing the tilt of the upper carrier toward the upside of the slope. Since the center of gravity of the upper carrier is dislocated toward the upside of the slope, a tipping moment is reduced, and hence, the slope traveling machine is able to travel with safety.

The slope traveling machine for carrying work comprises the upper carrier and the base carrier, the shoe elements of the shoe links of the base carrier are provided, in addition to the ordinary grousers, with the plate-shaped or bar-shaped projections as the anti-side slip grousers, the upper carrier is tilted by the hydraulic cylinders, and the center of gravity of the upper carrier is dislocated toward the upside of the slope. Thus, the crawler-mounted slope traveling machine for carrying work of the above structure has the following effects.

(1) The slope traveling machine for carrying work is capable of traveling on a slope in horizontal directions without causing the side slipping to attain the improvement in carrying work with safety and that in working efficiency. Further, the slope traveling machine for carrying work is capable of safely executing work without causing side slipping, while the slope traveling machine remains stationary.

(2) Accordingly, on a slope having no service road, human-powered work, which has been conventionally required, is remarkably reduced, any temporary support structure is unnecessary, and a term of work and construction costs are curtailed.

(3) Since the projections are arranged so as to leave a predetermined space between a pair of projections longitudinally adjacent to each other in the traveling direction, there is no possibility that a projection portion of a slope-protecting concrete frame is caught between the pair of projections and then subjected to shearing breakage.

(4) Since human-powered carrying work on a slope is replaced with machine work, the working environment is greatly improved.

(5) Since the upper carrier is tilted by the hydraulic cylinders, it is possible to always maintain the upper carrier in a horizontal position. Further, since the center of gravity of the upper carrier is dislocated toward the upside of the slope, carrying work is more safely and surely accomplished in cooperation with the anti-side slip grousers described above. Furthermore, materials are automatically unloaded from the upper carrier by increasing the tilt of the upper carrier.

BRIEF DESCRIPTION OF THE DRAWINGS

FIG. 2 shows the crawler-mounted slope traveling machine of FIG. 1, in which FIG. 2(a) is a front view and FIG. 2(b) is a side view;

FIG. 5 shows the shoe element of FIG. 4, in which FIG. 5(a) is a side view and FIG. 5(b) is a sectional view;

FIG. 6 is a graph showing the side slip determined through the horizontal travel of an experimental machine, in which FIG. 6(a) shows a case of varying the height of anti-side slip grousers, and FIG. 6(b) shows a case of varying the traveling speed;

FIG. 10 is a table showing the results of measurement of tests for verifying the load factor of the experimental machine;

FIG. 12 shows a crawler-mounted slope traveling machine for carrying work according to the present invention, in which FIG. 12(a) is a front view showing the traveling state, and FIG. 12(b) is a front view showing the unloading state of construction materials;

FIG. 13 is a side view showing the crawler-mounted slope traveling machine of FIG. 12;

FIG. 14 shows a shoe element according to the present invention, in which FIG. 14(a) is a perspective view, FIG. 14(b) is a side view and FIG. 14(c) is a sectional view;

FIG. 16 is a perspective view showing various columnar projections according to the present invention;

BEST MODE FOR EMBODYING THE INVENTION

The present invention will be described hereinafter with reference to illustrated embodiments. The embodiment shown FIGS. 1 to 11 is applied to a crawler-mounted drilling-mixing machine for executing a slope strengthening method, and the embodiment shown in FIGS. 12 to 15 is applied to a crawler-mounted slope traveling machine for carrying construction materials.

Figure 1:
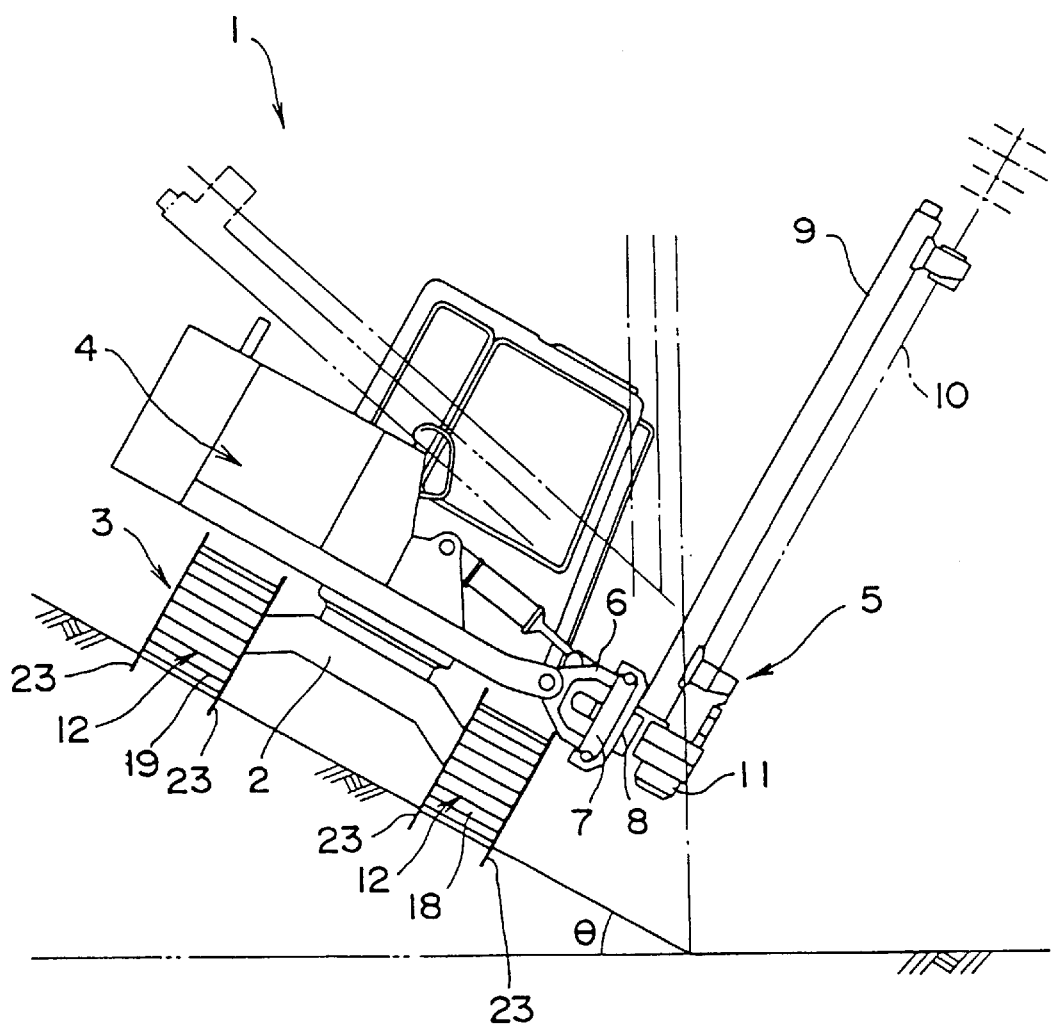
FIG. 1 is side view showing the operating state of a crawler-mounted slope traveling machine for construction work according to the present invention.
Figure 2:
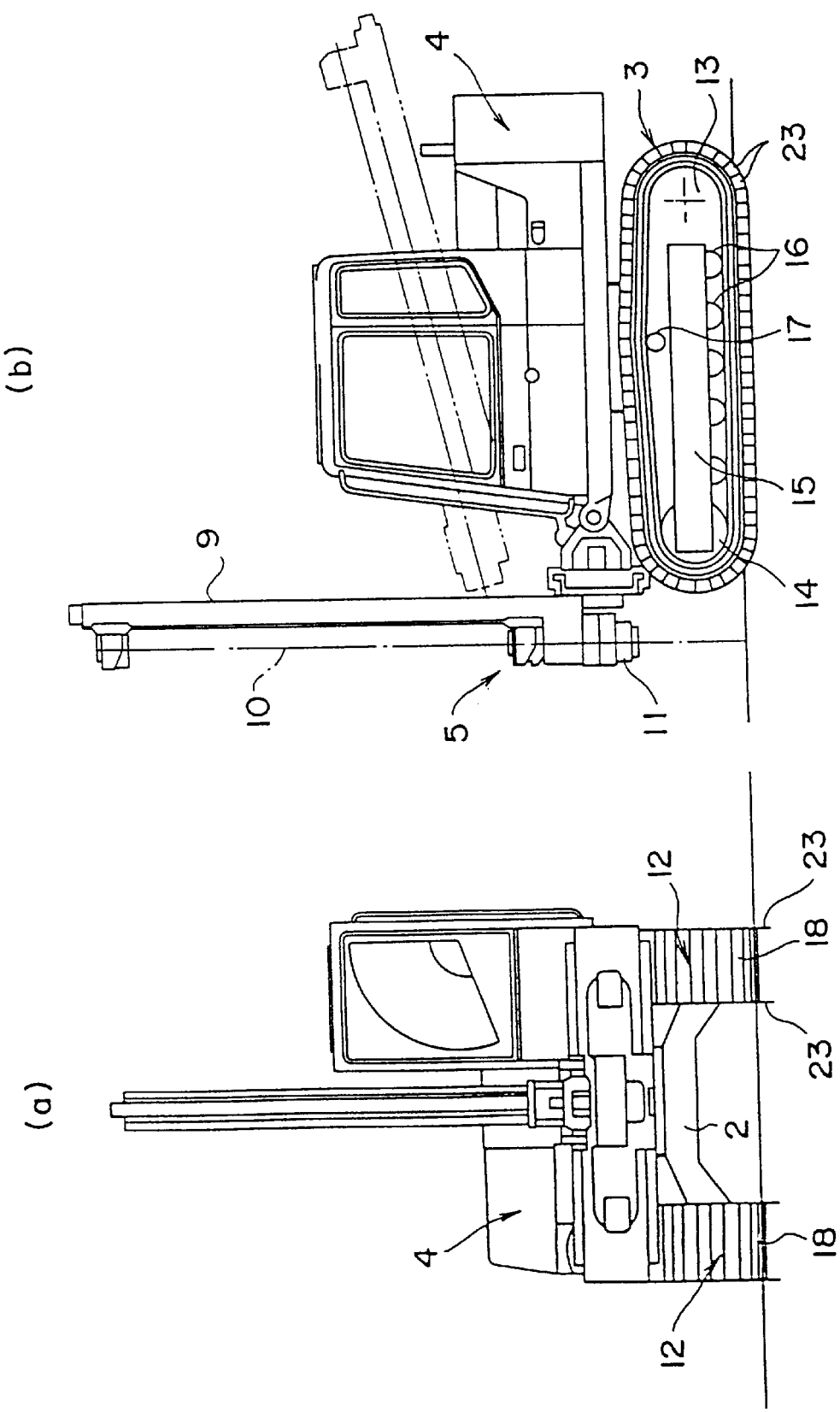

As shown in FIGS. 1 and 2, a crawler-mounted drilling-mixing machine 1 comprises, as principal components, a base frame 2, a base carrier portion 3, a revolving upper structure 4 and a front attachment 5. The revolving upper structure 4 is mounted for revolution on the base frame 2, and the front attachment 5 is supported up the front surface of the revolving upper structure 4 through a vertical tilting member 6, a turning member 7 and a transverse slide member 8. Thus, the front attachment 5 is set in required working positions and a stand-by position or the like.

The front attachment 5 includes a leader 9, an auger rod 10 movable along the leader 9 by means of a linear drive mechanism, and a motor 11 for driving the auger rod 10 for rotation. One end of the auger rod 10 is provided with an excavating blade, a mixing blade, a drag torque device and a solidifying-material discharge port. The auger rod 10 mixes the soil and a solidifying material together for solidification of the soil, while being driven and advanced to excavate the ground. In addition, an anchor material is inserted into the auger rod 10. The anchor material is laid in the central portion of soil cement resulting from mixing the soil and the solidifying material.

The base carrier portion 3 includes a shoe link 12, a drive sprocket 13, an idler 14, a track frame 15, track rollers 16 and a carrier roller 17 or the like. The shoe link 12 is composed of a large number of shoe elements 18 connected together in an endless form (See FIG. 2).

Figure 4:
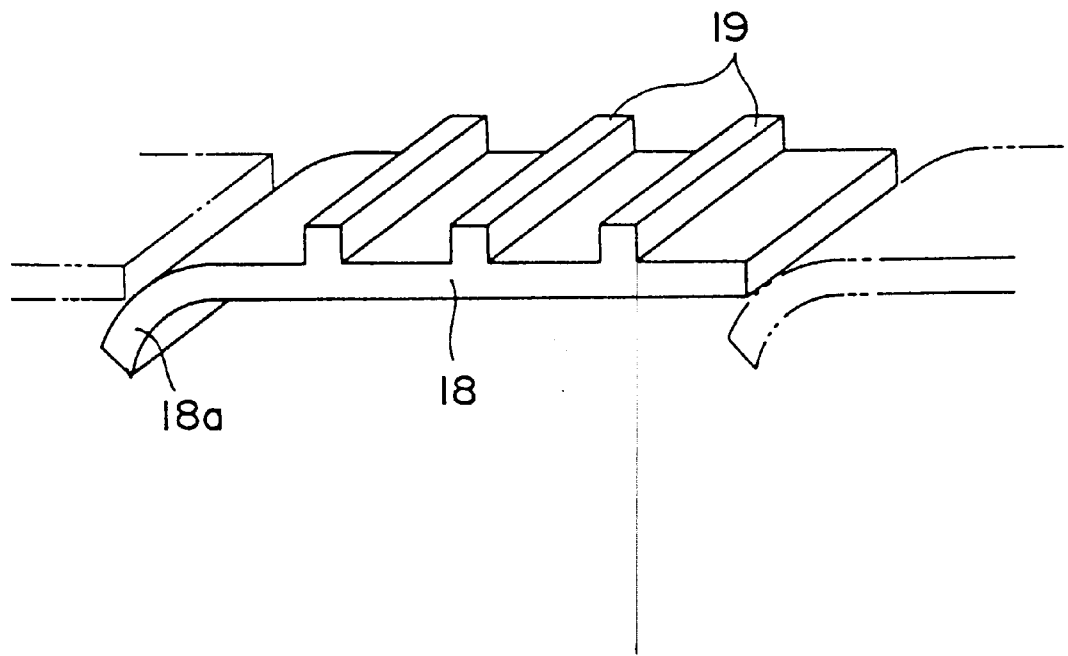
FIG. 4 is a perspective view showing a shoe element according to the present invention.
Figure 5:
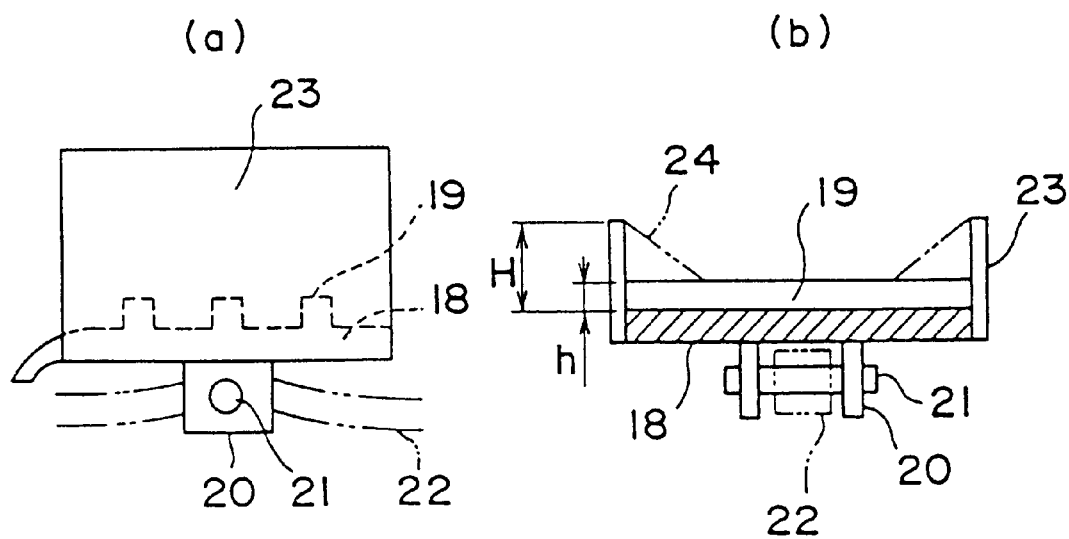
Figure 6:
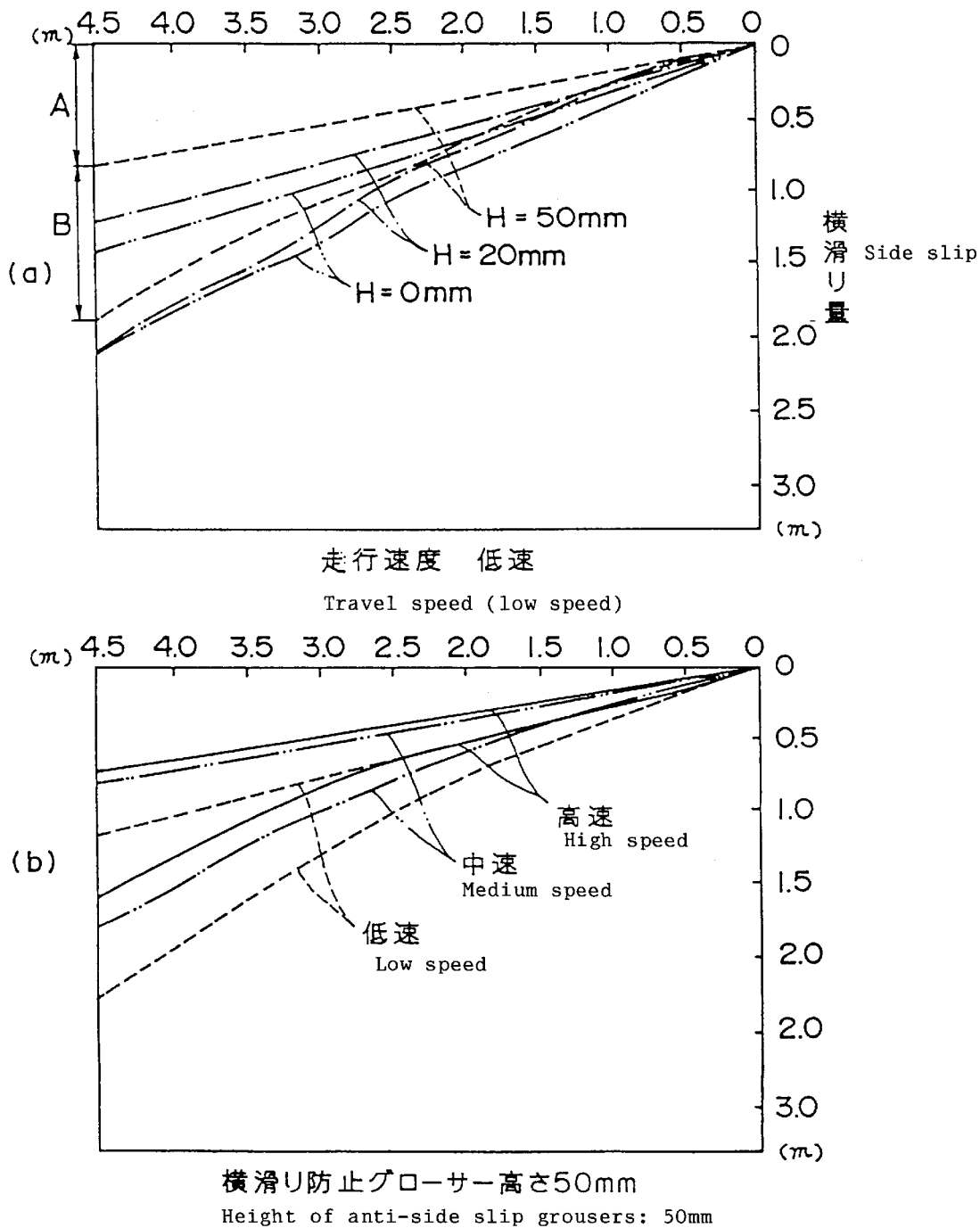

As shown in FIG. 4, each shoe element 18 is a unit member having an inwardly-curved portion 18a formed, for instance, on its front end in the advance direction, and a plurality of grousers 19 formed on its surface so as to extend perpendicularly to the traveling direction. A bracket 20 provided on the underside of each shoe element 18 is joined to an endless chain link 22 through a pin 21, and each shoe element 18 is thus connected to the endless chain link 22. Incidentally, the shape and structure or the like of the shoe elements 18 need not be limited to those shown in FIG. 4.

Plate-shaped projections (i.e., anti-side slip grousers) 23 are attached to the opposite side surfaces of each shoe element 18 in the traveling direction. The length of each plate-shaped projection 23 is approximately equal to the effective length of each shoe element 18. The linear portions of the plate-shaped projections 23 serve as a continuously plate-shaped stabilizer. In this case, the plate-shaped projections 23 are arranged continuously without substantially leaving a space therebetween. Alternately, the projections 23 may be arranged at intervals so as to leave a space therebetween.

The height H of each projection 23 from the outer surface of each shoe element 18 is set to be greater than the height h of each grouser 19. When necessary, reinforcing ribs 24 may be attached to the inner surfaces of the projections 23 for the improvement in strength of the projections.

Incidentally, since the shoe elements are usually produced by cutting a long material, the projections 23 and the shoe elements 18 are fabricated separately and then joined together by welding or with bolts. Alternately, the projections 23 may be formed integrally with the shoe elements 18. Further, the shoe link 12 need not be necessarily provided with the projections 23 on the opposite side surfaces in the width direction. Alternately, each shoe element 18 may be provided with one or a plurality of projections on an intermediate portion in the width direction.

Although the plate-shaped projections 23 are arranged so as to extend in parallel to the traveling direction, these projections 23 may be inclined to the traveling direction. Further, each shoe element 18 may be provided, instead of the plate-shaped projections 23, with bar-shaped projections such as spikes in a region of the surface between the grousers 19. In this case, it is conceivable that these bar-shaped projections may be arranged so as to extend in parallel to the traveling direction or may be studded on the surface of each shoe element 18.

Figure 3:
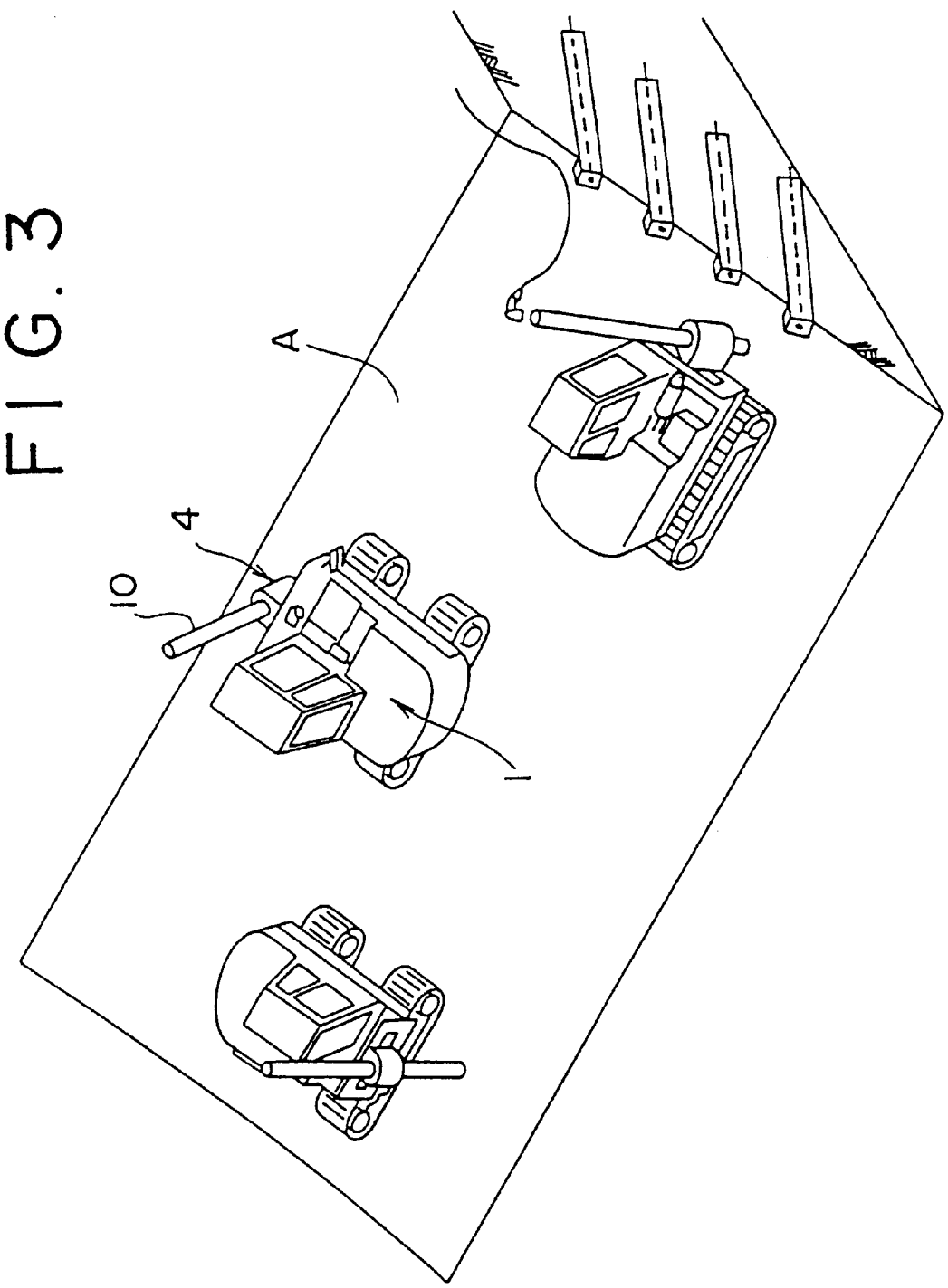
FIG. 3 is a schematic perspective view showing working positions of the crawler-mounted slope traveling machine on a slope.

As shown in FIG. 3, the crawler-mounted drilling-mixing machine 1 having the above structure is placed on a gentle slope A and allowed to travel horizontally along the slope to a predetermined position. Then, the revolving upper structure 4 is turned at the predetermined position, and the front attachment 5 is tilted, turned and slid to set the front attachment in a desired working position for drilling work for excavation, solidifying-material mixing and stirring work and anchor-material laying work.

When the drilling-mixing machine 1 travels horizontally, the projections 23 provided on the shoe links 12 serve as plate-shaped stabilizers to greatly reduce the side slip of the drilling-mixing machine 1 along the declination of the slope. Consequently, the drilling-mixing machine 1 is able to achieve stable traveling and efficient work, while the side slip of the drilling-mixing machine 1 due to load applied thereto during operation is prevented, so that the drilling-mixing machine 1 is able to operate with safety.

A description will now be given of the results of traveling tests, tests for verifying the stability during operation and tests for measuring the load factor. These test were made on condition that a small-sized crawler tractor (i.e., a ⅙-scale model of a practical 7-ton tractor) is equipped with a dummy front attachment, and the shoe link is mounted with plate-shaped anti-side slip grousers different from each other in height. Incidentally, the inclination of the slope was 35° and the height h of each grouser was 15 mm.

Traveling tests

FIG. 6(a) is a graph showing the results of measurement of the side slip from a horizontal contour line when the experimental crawler tractor traveled at low speed without corrective steering. As is obvious from FIG. 6(a), the greater the height H of each plate-shaped anti-side slip grouser is, the higher the effect of anti-side slipping is.

FIG. 6(b) is a graph showing the results of measurement of the side slip when the shoe link was mounted with plate-shaped anti-side slip grousers of 50 mm in height and the traveling speed of the crawler tractor was varied without corrective steering. As is obvious from FIG. 6(b), the higher the traveling speed is, the smaller the side slip is. It is inferred that such a tendency is due to the traveling speed lower than the breaking speed of the ground.

In FIGS. 6(a) and 6(b), each curved line indicates actual data determined by a variation of side slip and a deviation of the experimental crawler tractor from a desired traveling direction, and each straight line indicates corrected data, i.e., the actual side slip determined by removing the deviation from the measured data.

Figure 7:
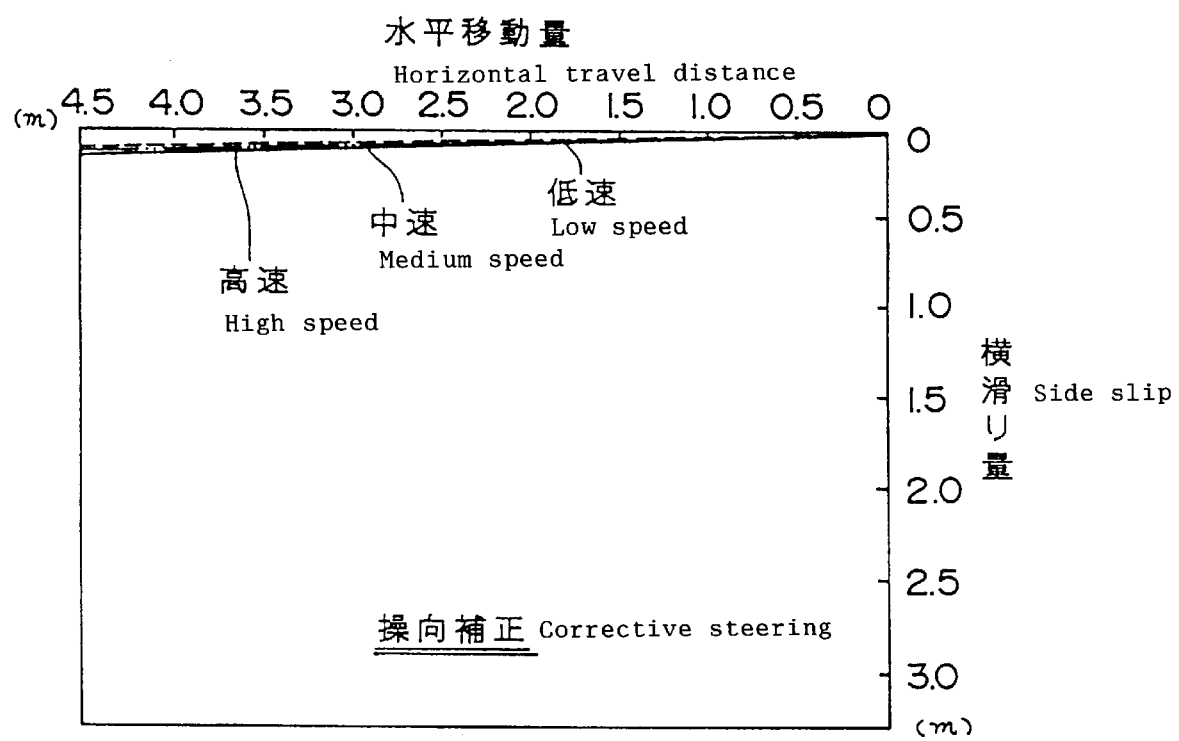
FIG. 7 is a graph showing the side slip determined through the horizontal travel of the experimental machine when corrective steering is made.

FIG. 7 shows the results of measurement of the side slip when the plate-shaped anti-side slip grousers were mounted on the left and right shoe links and corrective steering was made. As is obvious from FIG. 7, the side slip is not affected significantly by the travel speed and is dependent on the height of the plate-shaped anti-side slip grousers. Although not shown in FIG. 7, the anti-side slip effect of the downside shoe link provided with the plate-shaped anti-side slip grousers on the opposite side surfaces or only on the downside surface is satisfactory, though not as effective as the anti-side slip effect of the upside and downside shoe links provided with the plate-shaped anti-side slip grousers.
Test for verifying the stability during operation A hydraulic jack was arranged on the upside, the center and the downside of the dummy front attachment, the experimental crawler tractor was loaded at the respective hydraulic jack positions so that the experimental crawler tractor is lifted up toward the downside (i.e., inclination angle of mixed/stirred reinforced body), and the lift of the experimental crawler tractor and the side-slip load were measured.

Figure 8:
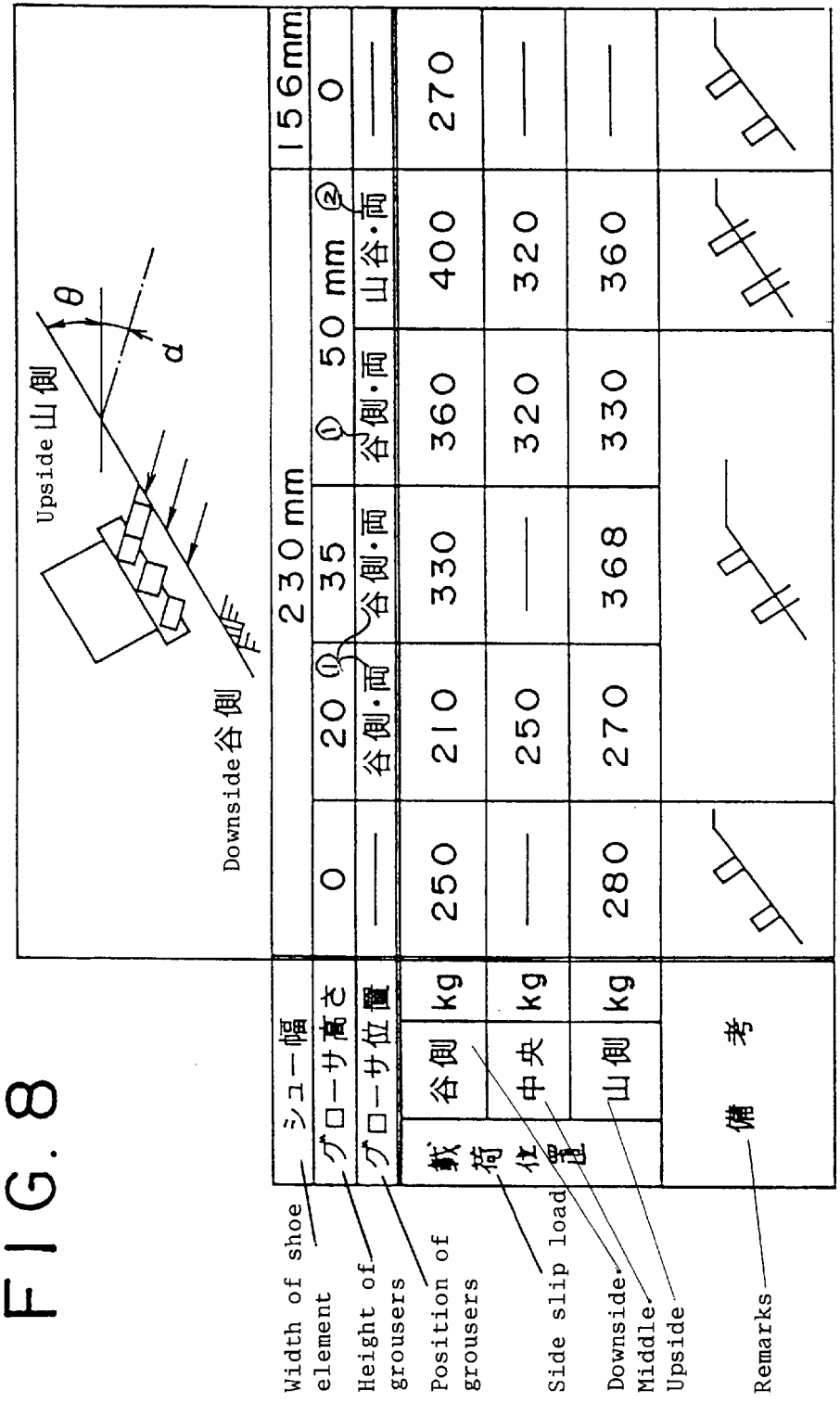
FIG. 8 is a table showing the results of measurement of tests for verifying the stability of the experimental machine during its operation.
Figure 9:
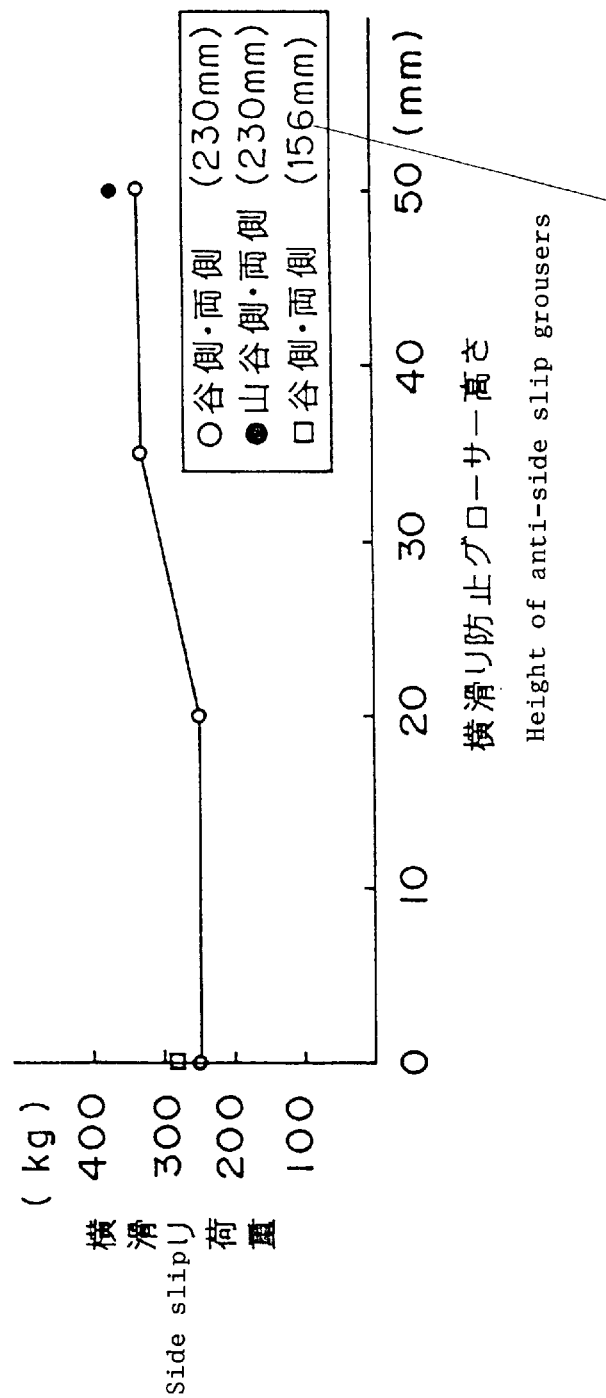
FIG. 9 is a graph showing the results of measurement of tests for verifying the stability of the experimental machine during its operation.
Figure 11:
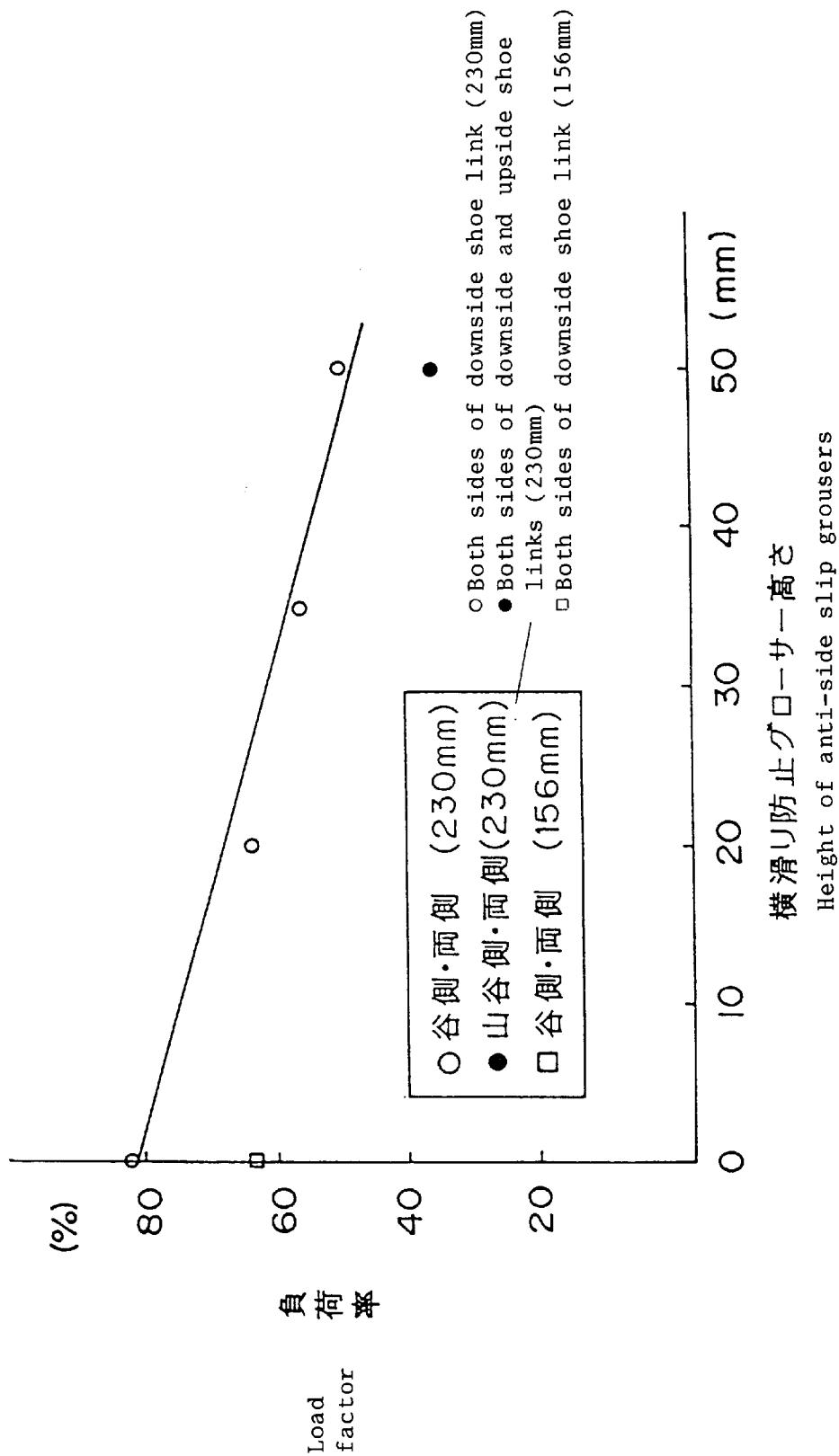
FIG. 11 is a graph showing the results of measurement of tests for verifying the load factor of the experimental machine.

FIGS. 8 and 9 show the results of measurement of the side-slip load. As is obvious from FIGS. 8 and 9, although the anti-side slip grousers of 20 mm in height H is scarcely effective in anti-side slipping action, the effect of anti-side slipping action develops as the height increases, and the satisfactory stability is secured when both the left and right shoe links are provided with the anti-side slip grousers of 50 mm in height H.
Tests for verifying the load factor The side slip occurred when the experimental crawler tractor was loaded from the upside by the hydraulic jack was measured. FIGS. 10 and 11 show the results of measurement. The side slip load factor is the ratio of side-slip force developed by the own weight of the experimental crawler track to the sum of side-slip force developed by the own weight of the experimental crawler tractor and external force forcibly acting on the experimental crawler tractor at the moment when the experimental crawler tractor starts side slipping, and is expressed by:

$$\text{side slip load factor} = W\theta\sin\theta/(W\cdot\sin\theta + F)$$

In this case, $860/(860+F) \times 100$ (%).

As is obvious from FIGS. 10 and 11, the side-slip load factor decreases as the height H increases beyond 20 mm. The side slip load factor is largely reduced to improve the stability against the high transverse load when the left and right shoe links are provided with the anti-side slip grousers of 50 mm in height H.

Figure 19:
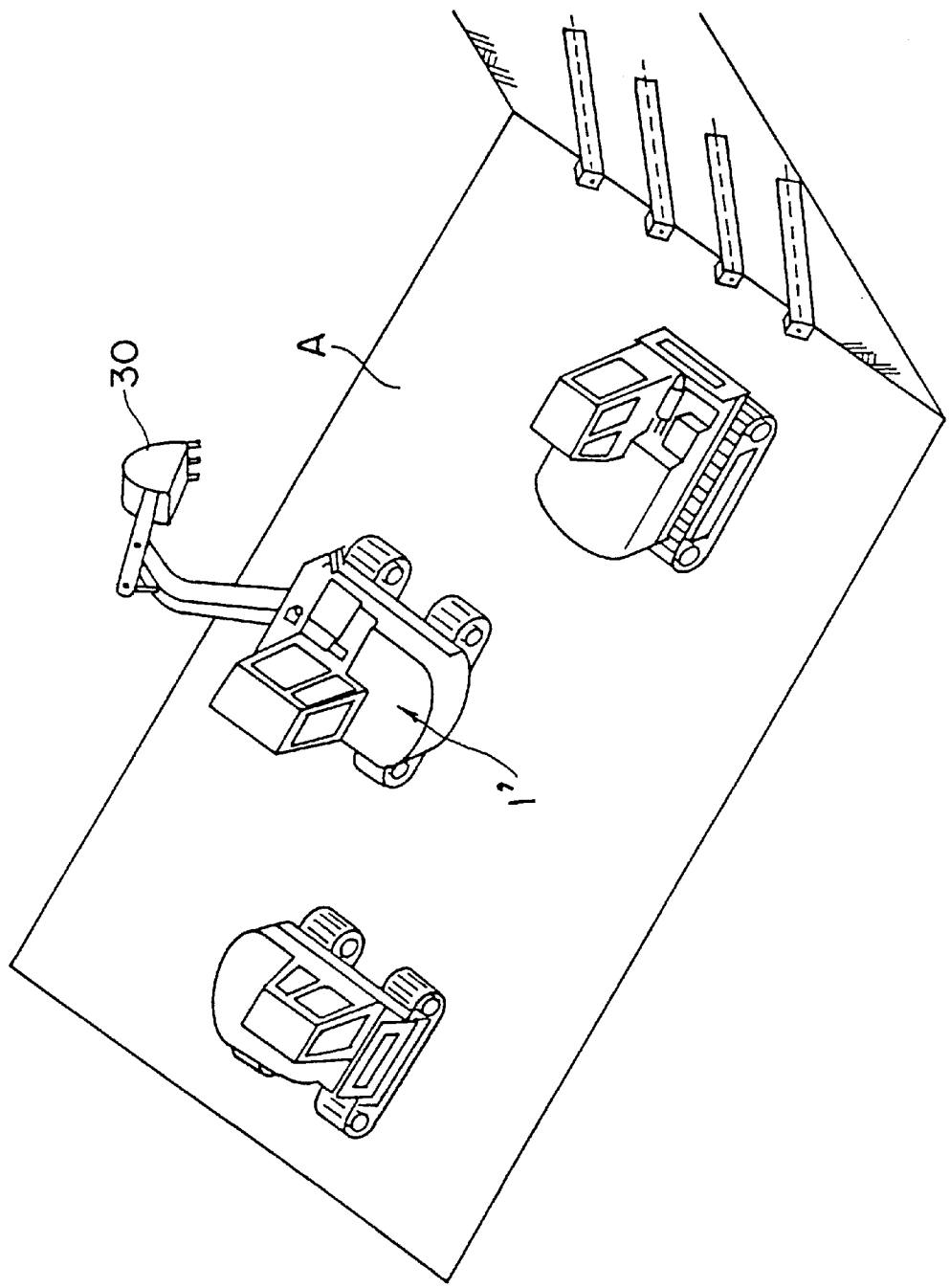
FIG. 19 is a schematic perspective view showing an embodiment, in which a crawler-mounted slope traveling machine for construction work according to the present invention is applied to a back hoe.

Although the above description has been given of the present invention applied to the drilling-mixing machine for the execution of slope strengthening work, it is a matter of course that the present invention is applicable to a crawler-mounted construction machine which travels on a slope to execute other construction works. For instance, as shown in FIG. 19, the present invention may be embodied in a back hoe having a revolving upper structure attached with a bucket 30, or may be embodied in other crawler-mounted slope traveling machines respectively mounted with a bulldozing blade of a bulldozer and a crane.

A description will now be given of a crawler-mounted slope traveling machine for carrying construction materials with reference to illustrated embodiments. As shown in FIGS. 12 and 13, a slope traveling machine 101 for carrying work according to the present invention corresponds to a carriage which travels on a gentle slope in the horizontal direction perpendicular to the declination of the slope and carries the construction materials. The slope traveling machine 101 for carrying work comprises, as principal components, a horizontal upper carrier 102 to be loaded with construction materials and a crawler-mounted base carrier 103.

The crawler-mounted base carrier 103 has a base frame 104, a pair of left and right base carrier portions 105, and a drive unit 106 or the like. The base carrier portion 105 has a shoe link 107, a drive sprocket 108, an idler 109, a track frame 110 and track rollers 111 and a carrier roller 112 or the like. The shoe link 107 is composed of a large number of shoe elements 113 connected together in an endless form (See FIG. 13).

As shown in FIG. 14, each shoe element 113 is a unit member having an inwardly-curved portion 113a formed, for instance, on its front end in the advance direction, and a plurality of grousers 114 formed on its surface so as to extend perpendicularly to the traveling direction. A bracket 115 provided on the underside of each shoe element 113 is attached to an endless chain link 117 through a pin 116, and each shoe element 113 is then connected to the endless chain link 117. Incidentally, the shape and structure or the like of the shoe elements 113 need not be limited to those shown in FIG. 4.

Plate-shaped projections (i.e., anti-side slip grousers) 118 are attached to the opposite side surfaces of each shoe element 113 in the traveling direction. The height of each projection 118 is approximately equal with the effective length of each shoe element 113, and linear portions of the plate-shaped projections 118 serve as a continuously plate-shaped stabilizer. In this case, the plate-shaped projections 118 are arranged continuously without substantially leaving a space therebetween. Alternately, the projections 118 may be arranged at intervals so as to leave a space therebetween.

The height H of each projection 118 from the outer surface of each shoe element 113 is set to be greater than the height h of each grouser 114. When necessary, reinforcing ribs 119 may be attached to the inner surfaces of the projections 118 for the improvement in strength of the projections.

Incidentally, since each shoe element is usually produced by cutting from a long material, the projections 118 and the shoe elements 113 are fabricated separately and joined together by welding or with bolts. Alternately, the projections may be formed integrally with the shoe elements 113. Further, the shoe link need not be necessarily provided with the projections 118 on the opposite side surfaces in the width direction. Alternately, each shoe element 113 may be provided with one or a plurality of projections on an intermediate portion in the width direction.

Although the plate-shaped projections 118 are arranged to extend in parallel to the traveling direction, these projections 118 may be inclined to the traveling direction. Further, each shoe element 113 may be provided, instead of the plate-shaped projections 118, with bar-shaped projections such as spikes in a region of the surface between the grousers 114. In this case, it is conceivable that the bar-shaped projections may be arranged so as to extend in parallel to the traveling direction or may be studded on the surface of each shoe element 113.

The upper carrier 102 has an open upper end and is capable of being loaded with earth and sand, concrete blocks or elongate materials such as pipes and sheet piles. The upper carrier 102 is mounted on the base carrier 103 so as to be tilted in a direction perpendicular to the traveling direction. Namely, a supporting table 120 is mounted on the base frame 104 of the base carrier 103, and a portion on the upside of the lower surface of the upper carrier 102 is hinged to the supporting table 120 by a hinge mechanism 121. A pair of hydraulic cylinders 122 are arranged between the upper carrier 102 and the base carrier 103 so as to extend in the traveling direction.

In each hydraulic cylinder 122, the base end of the cylinder is pivotally joined to the base frame 104 with a pin, and the front end of a piston rod is pivotally joined to the lower surface of the upper carrier 102. A hydraulic unit for driving the hydraulic cylinders 122 is built in the base carrier 103 together with a drive mechanism for driving the base carrier 103, so that the slope traveling machine 101 for carrying work has its center of gravity at a low position. Incidentally, the hydraulic cylinders 122 are stored in the base carrier 103 when fully contracted. It is preferable that the upper carrier 102 is always set in a horizontal position on the supporting table 120 on the level ground.

The upper carrier 102 is always held in a horizontal position when the slope traveling machine 101 for carrying work travels horizontally on a slope regardless of the inclination of the slope by properly adjusting the inclination of the upper carrier 102 through the operation of extending or contracting the piston rods of the hydraulic cylinders 122. Further, earth and sand or the like loaded on the upper carrier 102 are unloaded by further tilting the upper carrier 102 from its set horizontal position toward the upside of the slope. A side plate on the upside of the upper carrier 102 is formed as a hinged door 102a to facilitate unloading the earth and sand or the like.

Further, the center of gravity of the upper carrier 102 with respect to the direction perpendicular to the traveling direction is dislocated from a position corresponding to the center of gravity of the base carrier 103 toward the upside of the slope so that a moment reverse to the tipping moment acts on the base carrier 103 when the slope traveling machine 101 for carrying work travels horizontally on the slope, and consequently, an effective tipping moment is reduced.

Incidentally, the base carrier 103 is provided with an operating box to enable the operator to operate both the upper carrier and the base carrier. The base carrier 103 may be provided with an operator's seat.

Figure 15:
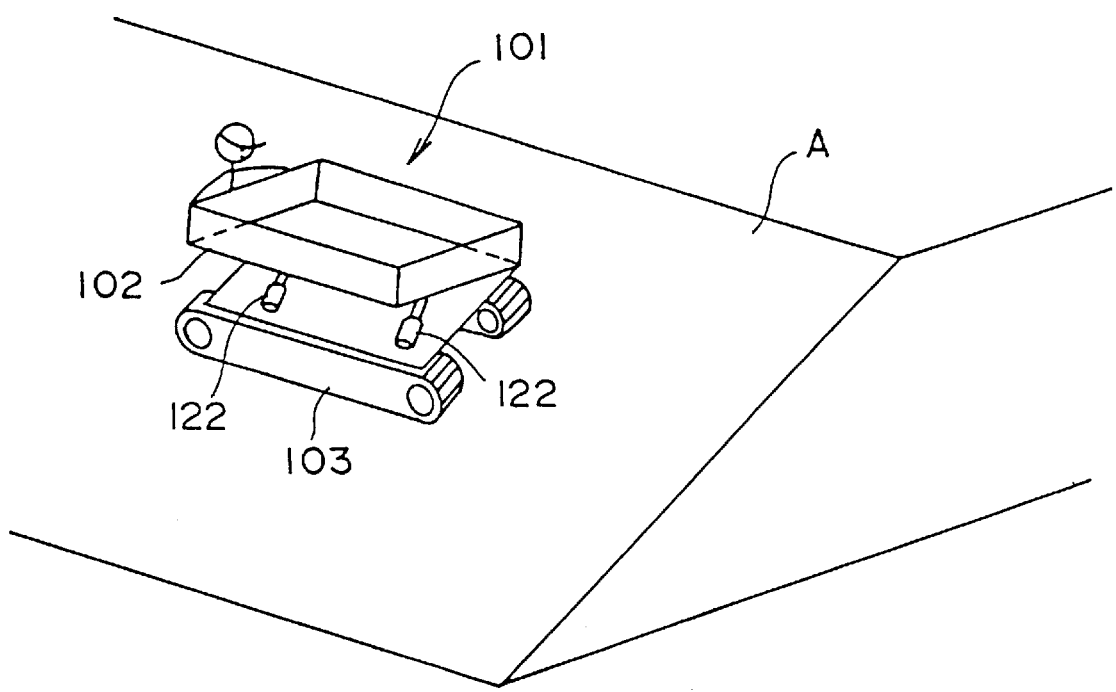
FIG. 15 is a perspective view showing a crawler-mounted slope traveling machine for carrying work according to the present invention when operated on a slope.

As shown in FIG. 15, the slope traveling machine 101 for carrying work having the above structure is placed on a gentle slope A and allowed to travel horizontally on the slope A to carry the construction materials. The upper carrier 102 is tilted at a predetermined position by the hydraulic cylinders 122 to unload the earth and sand or the like.

When the slope traveling machine 101 for carrying work travels horizontally on the slope, the projections 118 provided on the shoe links 107 serve as plate-shaped stabilizers, so that the slipping along the declination of the slope is remarkably reduced. For instance, the plate-shaped projections 118 (i.e., height h of each grouser 114=15 mm) of around 50 mm in height H are sufficiently effective in anti-side slipping against the slope with the inclination of 35°. Accordingly, the slope traveling machine for carrying work is able to achieve stable traveling and efficient work, while the side slip is prevented even when the slope traveling machine for carrying work remains stationary, so that the slope traveling machine for carrying work is able to execute work with safety. Further, since the upper carrier 102 is kept in a horizontal position by the hydraulic cylinders 122, earth and sand or the like will not fall off the upper carrier 102. Since the center of gravity of the upper carrier 102 is dislocated toward the upside of the slope, the construction materials are carried with more safety.

Figure 20:
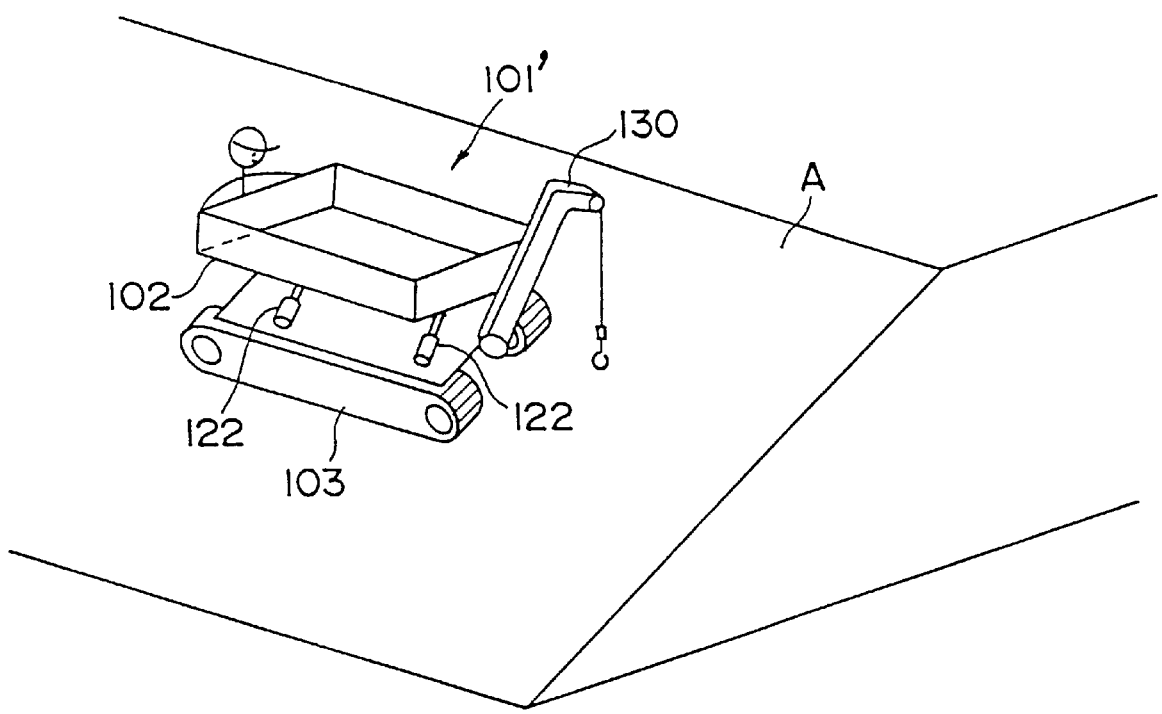
FIG. 20 is a schematic perspective view showing an embodiment, in which a crawler-mounted slope traveling machine for carrying work according to the present invention is equipped with crane.

Incidentally, a crane 130 may be attached to the slope traveling machine 101 for carrying work as shown in FIG. 20 to load or unload materials such as concrete blocks through the crane.

A detailed description will be given of the projections of the shoe links. The projections 23 and 118 described above are plate-shaped projections arranged continuously or at intervals so as to extend in parallel to or at an inclination to the traveling direction. These projections 23 and 118 are highly effective in anti-side slipping when used on a slope covered with only earth and sand.

Figure 18:
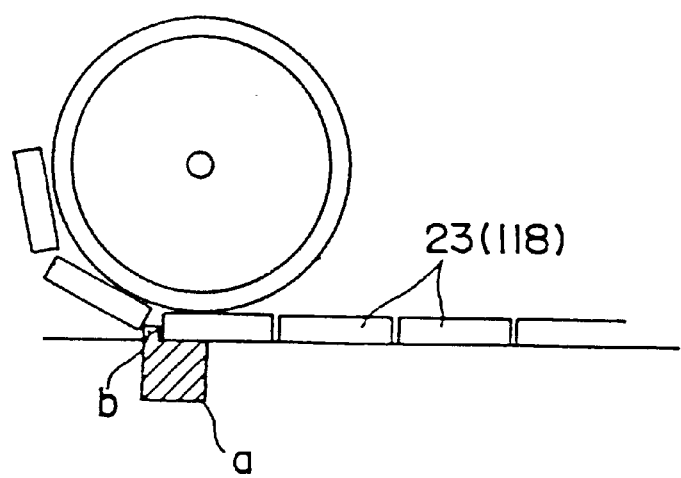
FIG. 18 is a schematic side view showing a case where a columnar projection causes the shearing breakage of a projection portion of a slope-protecting concrete frame.

On the other hand, when the slope is provided with a slope protecting structure such as a slope-protecting concrete frame, portions of the slope-protecting concrete frame are broken by the plate-shaped projections in some cases. Namely, as shown in FIG. 18, a slope-protecting concrete frame a has a projection portion b adapted to guide rainwater. When the plate-shaped projections 23 are arranged continuously in the traveling direction without substantially leaving a space between the adjacent plate-shaped projections 23, there is a possibility that the projecting portion b is caught between the pair of plate-shaped projections 23 (or 118) longitudinally adjacent to each other in the traveling direction and then subjected to shearing breakage. Further, when the slope traveling machine 1 or the slope traveling machine 101 for carrying work or the like turns to a different direction, the plate-shaped projections damage the surface of the slope greatly.

Figure 17:
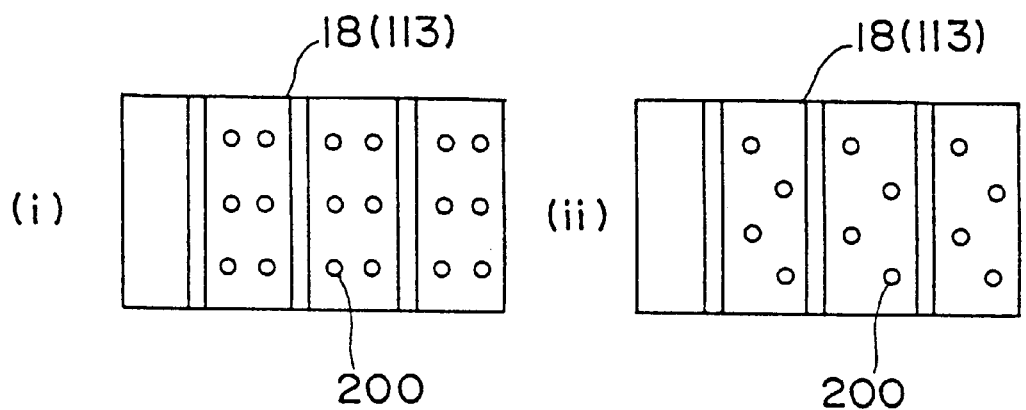
FIG. 17 is a plan view showing the planar arrangement of the columnar projections of FIG. 16.

Therefore, when the slope traveling machine or the slope traveling machine for carrying work is to be used on a slope provided with the slope-protecting concrete frames or the like or on a slope, to which excessive damage of the slope is detrimental, it is preferable that the shoe elements are provided with columnar projections as described above, instead of the plate-shaped projections, and that such columnar projections are studded on the surface of the shoe elements. FIG. 16 shows available columnar projections such as bar-shaped projections 200-1, tubular (box-shaped projections 200-2, deformed plate-shaped projections 200-3, conical projections 200-4, and truncated cone-shaped projections 200-5. Incidentally, these columnar projections 200 may be studded in rows and columns or in a zigzag arrangement as shown in FIG. 17 or in a random arrangement.

When the shoe links 12 (or 107) have the shoe elements 18 (or 113) each studded on its surface with the columnar projections 200 as described above, there is no possibility that the projecting portion of the slope-protecting concrete frame is caught and subjected to shearing breakage, differently from the case of the shoe links provided with the plate-shaped projections 23 arranged continuously in the traveling direction. Further, when the slope traveling machine 1 or the slope traveling machine 101 for carrying work or the like turns to a different direction, the surface of the slope is not significantly damaged and only grooves are formed therein. Such damage is not as serious as that may be caused by the plate-shaped projections. The shearing breakage of the projecting portions of the slope-protecting concrete frames by the plate-shaped projections 23 (or 118) may be avoided when the plate-shaped projections 23 (or 118) are arranged at appropriate intervals.

When the height of each columnar projection is expressed as H, the desirable intervals between the columnar projections 200 on the surface of the shoe element are in the range of 0.5 to 3 H. Although depending on the width of the columnar projections 200, the columnar projections 200 cause the breakage of the projecting portions of the slope-protecting concrete frames, or intolerable damage of the surface of the slope due to turning of the slope traveling machine, similarly to the case of the plate-shaped projections, when the intervals between the columnar projections are excessively small. On the other hand, the traveling without causing the side slip on the slope is impossible, when the intervals between the columnar projections are excessively large.

We claim:

1. A crawler-mounted slope traveling machine composed of a base carrier and an upper structure, wherein said base carrier has shoe links composed of shoe elements connected together in an endless form and said upper structure has a front attachment for working, comprising:

a plurality of grousers mounted on said shoe elements, each of said grousers extending perpendicularly to the traveling direction of said traveling machine; and projections, each having a height greater than that of each grouser, said projections being mounted on lateral ends of a bearing surface of each of said shoe elements so as to extend in said traveling direction;

wherein said projections are attached to said shoe elements at intervals so as to leave a predetermined space between the adjacent projections in the traveling direction in such a way that said shoe elements are arranged along a straight line.

2. A crawler-mounted slope traveling machine for carrying work composed of an upper carrier to be loaded with construction materials, and a base carrier equipped with shoe links composed of shoe elements connected together in an endless form, comprising:

a plurality of grousers mounted on said shoe elements, each of said grousers extending perpendicularly to the traveling direction of said traveling machine; and projections, each having a height greater than that of each grouser, said projections being mounted on lateral ends of a bearing surface of each of said shoe elements in a manner to extend in said traveling direction;

wherein said projections are attached to each shoe element at intervals so as to leave a predetermined space between the adjacent projections in the traveling direction in such a way that said shoe elements are arranged along a straight line.

3. A crawler-mounted slope traveling machine for carrying work according to claim 2, wherein said upper carrier is mounted on the base carrier to be freely tilted in directions perpendicular to the traveling direction, and made tiltable by hydraulic cylinders.

4. A crawler-mounted slope traveling machine for carrying work according to claim 2, wherein the center of gravity of the upper carrier in a direction perpendicular to the traveling direction is dislocated from a position corresponding to the center of gravity of the base carrier toward the upside of a slope.

* * * * *